US008628716B1

(12) United States Patent
McPherson et al.

(10) Patent No.: US 8,628,716 B1
(45) Date of Patent: Jan. 14, 2014

(54) METHOD OF MANUFACTURING A POWDERED METAL-FILLED PLASTIC MEMBER

(75) Inventors: Mark W. McPherson, Otsego, MI (US); William R. McPherson, Otsego, MI (US)

(73) Assignee: Tengam Engineering, Inc., Otsego, MI (US)

( * ) Notice: Subject to any disclaimer, the term of this patent is extended or adjusted under 35 U.S.C. 154(b) by 643 days.

(21) Appl. No.: 12/848,573

(22) Filed: Aug. 2, 2010

(51) Int. Cl.
*B29C 45/20* (2006.01)
(52) U.S. Cl.
USPC ............... 264/429; 264/279; 264/328.12
(58) Field of Classification Search
USPC .................. 264/427, 429, 279, 328.12
See application file for complete search history.

(56) References Cited

U.S. PATENT DOCUMENTS

| | | | | |
|---|---|---|---|---|
| 2,199,144 | A | * | 4/1940 | Tegarty ................. 264/279 |
| 4,277,435 | A | * | 7/1981 | Allen .................... 264/328.12 |
| 4,327,346 | A | * | 4/1982 | Tada et al. ............ 335/296 |
| 4,496,303 | A | * | 1/1985 | Loubier ................ 425/569 |
| 5,489,631 | A | * | 2/1996 | Dubois ................. 524/13 |
| 5,942,169 | A | * | 8/1999 | Narazaki et al. ...... 264/40.1 |

FOREIGN PATENT DOCUMENTS

| | | | |
|---|---|---|---|
| JP | 58-148645 | * | 9/1983 |
| JP | 60-210142 | * | 10/1985 |

OTHER PUBLICATIONS

Masuzawa, M.; Mita, M. and Aimuta, K., "Development of a Multimagnetic Property Member for Permanent Magnet Motor," IEEE Transactions on Magnetics, vol. 42, No. 10, pp. 3500-3502, Oct. 2006.
Amano, H.; Enomoto, Y. and Ito, M., "Characteristics of a Permanent-Magnet Synchronous Motor with a Dual-Molding Permanent-Magnet Rotor," IEEE Transactions on Magnetics, pp. 1-7, 2007.

* cited by examiner

*Primary Examiner* — Jill Heitbrink
(74) *Attorney, Agent, or Firm* — Gardner, Linn, Burkhart & Flory, LLP (57) ABSTRACT

A method of manufacturing a bonded metal assembly having a form and a powdered metal-filled plastic member with a cylindrical surface generally surrounding the form includes providing a mold having a cylindrical interior surface corresponding to the cylindrical surface of the resulting powdered metal-filled plastic member and providing a gate to the mold. The gate extends at least partially along a radius of the cylindrical interior surface of the mold. With the form positioned in the mold, a powdered metal-filled plastic material is injected through the gate to the mold and flowed around the form. A resulting bonded metal assembly includes a form and a powdered metal-filled plastic member having a cylindrical surface generally surrounding the form. The powdered metal-filled plastic member includes an injection-molding gate line extending at least partially along a radius of the cylindrical surface.

25 Claims, 7 Drawing Sheets

METHOD OF MANUFACTURING A POWDERED METAL-FILLED PLASTIC MEMBER

BACKGROUND OF THE INVENTION

The present invention is directed to an injection-molded article and method of manufacturing thereof and, in particular, to an injection-molded powdered metal-filled plastic member and method of manufacture thereof. While the invention is illustrated with manufacture of a permanent magnet molded over a form, such as a rotor of a brushless DC motor, it may apply to other types of bonded metal assemblies, such as electrical generators, electro-magnetic sensors, and the like.

It has long been known to manufacture powdered metal-filled plastic members, such as permanent magnets using injection-molding techniques. This is accomplished by injecting or shooting a molten or liquid powdered metal-filled plastic material into a hollow cavity, known as a mold, and allowing the material to cool to a point of solidification or otherwise curing the material.

SUMMARY OF THE INVENTION

While this technique has worked well when manufacturing relatively small powdered metal-filled plastic members, such as on the order of magnitude of 4 to 5 grams, the high specific gravity of powdered metal-filled plastic material has made molding of larger parts impractical. The present invention provides the ability to be able to manufacture larger components, for example, components of up to 28 grams or more. As brushless DC motors and other bonded metal assemblies find additional applications, there is a need for bonded metal assemblies of a larger size. However, the invention is not limited to any particular size.

A method of manufacturing a bonded metal assembly having a form and a powdered metal-filled plastic member having a cylindrical surface generally surrounding the form, according to an aspect of the invention, includes providing a mold having a cylindrical interior surface corresponding to the cylindrical surface of the resulting powdered metal-filled plastic member and providing a gate to the mold. The gate extends at least partially along a radius of the cylindrical interior surface of the mold. With the form positioned in the mold, a powdered metal-filled plastic material is injected through the gate to the mold and flowed around the form.

At least a portion of the material may flow generally tangentially along the cylindrical interior surface of the mold. The gate may open in a direction forming an angle to the radius of the cylindrical interior surface at the gate. In this manner, the gate has a component that is tangential to the cylindrical interior surface of the mold. The gate may be at an angle of between approximately 30 degrees and approximately 60 degrees to the radius of the cylindrical interior surface.

The bonded metal assembly may be ejected radially from the mold. The method may be used to manufacture a bonded metal assembly having a powdered metal-filled plastic member with a length to diameter ratio that is greater than 1 to 1. The ratio may be greater than 2 to 1. The gate may extend at least 50% of the length of the cylindrical inner surface of the mold and may extend at least 80% of the length of the cylindrical inner surface of the mold. The method may be used to manufacture a bonded metal assembly weighing at least approximately 28 grams and may be used to manufacture a permanent magnet assembly having a cylindrical shaft, such as a rotor of a brushless DC motor producing at least approximately 50 watts of mechanical power or greater.

A method of manufacturing a powdered metal-filled plastic member having a curved outer surface, according to another aspect of the invention, includes providing a mold having a curved interior surface corresponding to the curved outer surface of the member. A gate is provided to the mold. The gate opens at an angle to the radius of the curved outer surface of the member. A powdered metal-filled plastic material is injected through the gate to the mold and at least a portion of the material flows generally tangentially along the curved interior surface of the mold.

The curved interior surface may be a generally cylindrical surface. The gate may extend at least 50% of the length of the cylindrical surface and may extend at least 80% of the length of the cylindrical surface. At least a portion of the material may flow more than half of the circumference of the cylindrical surface and may flow substantially the full circumference of said cylindrical surface. The gate may open at an angle of between approximately 30 and 60 degrees to the radius of the curved outer surface of the magnet. The gate may open at an angle of between approximately 30 and 60 degrees to the radius of the curved outer surface of the member.

A form may be positioned in the mold prior to the injecting. At least a portion of the material may flow generally unidirectionally along the curved interior surface around the form. The method may be used to manufacture a permanent magnet. The form may be a cylinder having a central portion and outer portions, with the central portion having a greater radius than the outer portions. The powdered metal-filled plastic member may extend outwardly past the central portion.

A bonded metal assembly, according to an aspect of the invention, includes a form and a powdered metal-filled plastic member having a cylindrical surface generally surrounding the form. The powdered metal-filled plastic member includes an injection-molding gate line extending at least partially along a radius of the cylindrical surface.

The powdered metal-filled plastic member may have a length to diameter ratio that is greater than 1 to 1 and may be greater than 2 to 1. The gate line may extend at least 50% of the length of the cylindrical surface and may extend at least 80% of the length of the cylindrical surface. The form may be a cylindrical shaft having a central portion and outer portions. The central portion may have a greater radius than the outer portions. The powdered metal-filled plastic member may be a permanent magnet and may extend outwardly past the central portion. The central portion may have a knurled outer surface.

The powdered metal-filled plastic member may exclude any substantial knit line generally circumferentially opposite the gate line. The member may weigh at least approximately 28 grams and may have a substantially uniform diameter along the length thereof. The bonded metal assembly may be used in a brushless direct current motor. Such brushless direct current motor may produce at least approximately 50 watts of mechanical power.

These and other objects, advantages and features of this invention will become apparent upon review of the following specification in conjunction with the drawings.

DESCRIPTION OF THE PREFERRED EMBODIMENT

Figure 1:
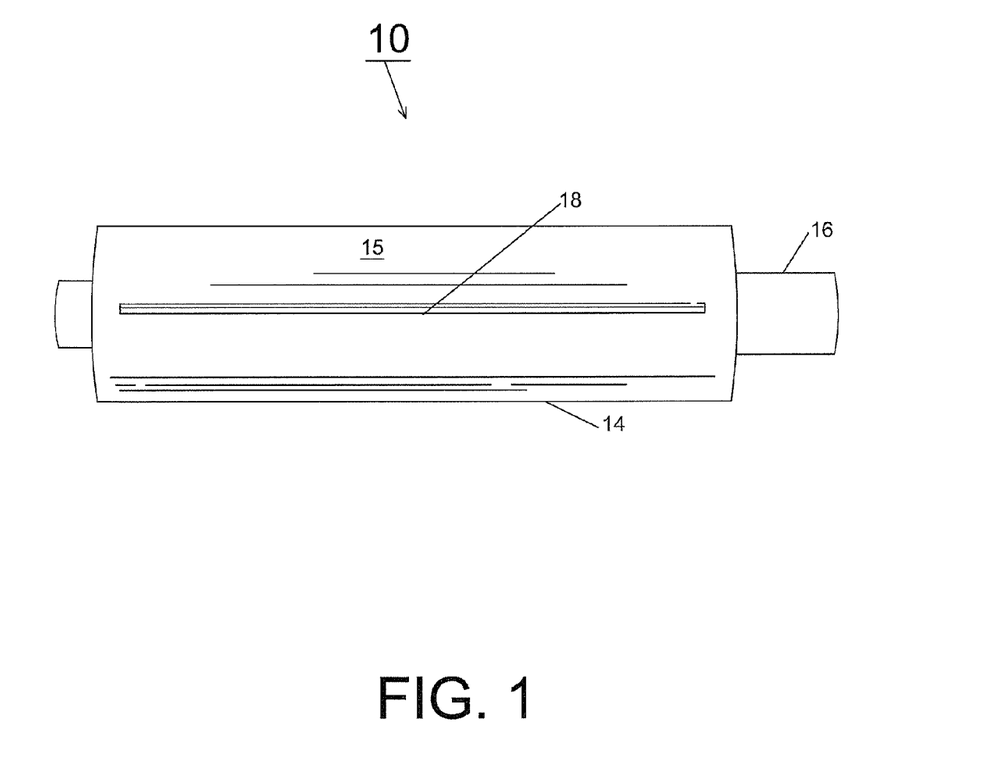
FIG. 1 is a perspective view of a bonded metal assembly, according to an embodiment of the invention.
Figure 2:
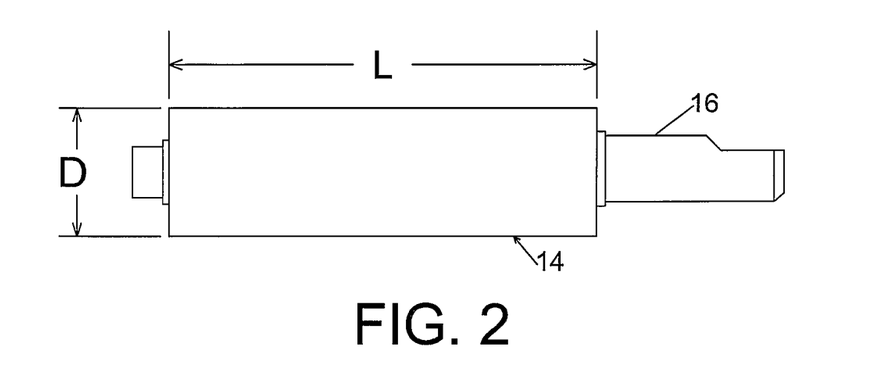
FIG. 2 is a side elevation of the assembly in FIG. 1.

Referring now to the drawings and the illustrative embodiments depicted therein, a bonded metal assembly 10 is shown including an insert, such as a cylindrical shaft 16 and a powdered metal-filled plastic member 14, surrounding the shaft (FIG. 1). Member 14 has a cylindrical surface 15 that generally surrounds shaft 16. Bonded metal assembly 10 and, in particular, powdered metal-filled plastic member 14 are manufactured utilizing injection molding techniques, as will be discussed in more detail below. In particular, member 14 is molded over shaft 16 from a powdered metal-filled plastic material. A powder can be spherical, flake or other shape of particle. Various blends of material may be used, including an iron powder, such as magnetic NdFeB or a magnetic ferrite, in a plastic, such as polyamide, polyphenylene sulfide, or the like. However, other metals, such as tungsten, and the like, may be used. In the illustrated embodiment, bonded metal assembly 10 is a permanent magnet assembly 10 in the form of a rotor of the type used in a brushless direct current (DC) motor. It may be used in various sizes, such as up to 28 grams or more. It is capable of production of a greater output than conventional bonded magnet brushless DC motors, such as greater than 50 watts and even 350 watts to 500 watts or greater. However, bonded metal assembly 10 may find different applications, such as electrical generators, electro-magnetic sensors, and the like. Also, certain aspects of the invention may find application to metallic members other than permanent magnets and to powdered metal-filled plastic members that are not formed around an insert.

In the illustrated embodiment, powdered metal-filled plastic member 14 has a length L and a diameter D. The ratio of L/D is at least 1 and may be greater than 1, such as 2/1, 4/1, and the like. For example, length L may be three (3) inches and diameter D one (1) inch. The ratio of L/D is relevant to injection molding of assembly 10. In order to provide for adequate uniformity of metal powder in the plastic material, the powdered metal-filled plastic member includes an injection-molding gate line 18 that extends at least partially along the radius R of the cylindrical surface. This may also be referred to as a tangent line because the line that extends along the radius of a cylinder is a line where a plane tangent to the surface intersects the surface. In the illustrated embodiment, gate line 18 extends at least 50% of the length L of cylindrical surface 15 and extends at least 80% of length L, although it may extend upward of 90% and even 100% of length L. Gate line 18 is formed by the flow of powdered metal-filled plastic material through a gate 25 which produces a runner 26 which extends from gate line 18 during the injection-molding process. In the illustrated embodiment, the cross-sectional area of the gate can be larger than entry to the mold. This reduces the distance the material must flow from gate point entry until the location where the material stops flowing. This reduces cycle time of the process.

Figure 3:
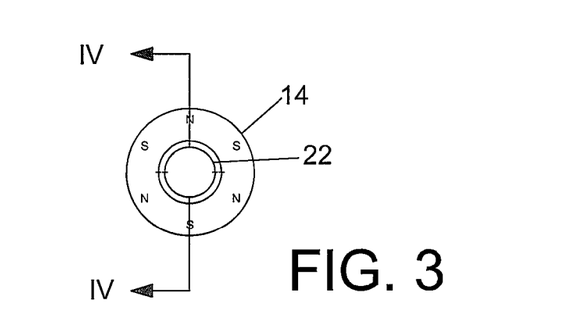
FIG. 3 is an end elevation of the assembly in FIG. 1.
Figure 5:
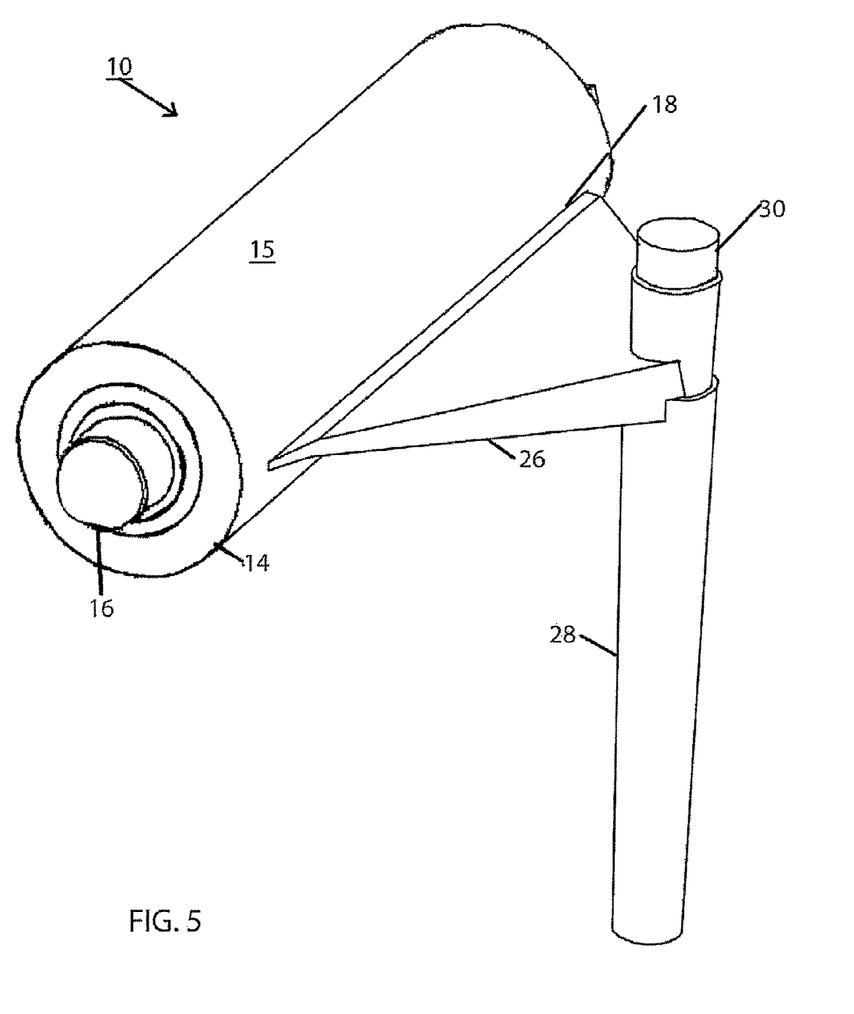
FIG. 5 is a perspective view of a runner attached to the bonded metal assembly in FIG. 1.

In order to form gate line 18 in this manner, runner 26 is in the shape of an angular fan that extends outwardly from a sprue 28. As is understood by the skilled artisan, runner 26 and sprue 28 are left over material in the channels of the mold that supply material to form powdered metal-filled plastic member 14. A cold slug 30 of scrap material extends from sprue 28 distal of runner 26 and is formed from the first portion of the material shot injected toward the mold, which is at too low of a temperature to form a portion of the final core, as is known in the art. Runner 26 is removed in a conventional secondary operation thereby leaving leave gate line 18 remaining. As is also conventional, if powdered metal-filled plastic member 14 is to be a permanent magnet, it is magnetically treated after it is molded using an electrical current applied to coils in order to apply magnetic fields to core 14 in order to define two or more sets of magnetic poles (indicated by the symbols N, S, N, S, N, S in FIG. 3), thereby forming a magnetized permanent magnet. All references herein to "permanent magnet" may refer to member 14 either before or after it is magnetically treated.

Figure 7:
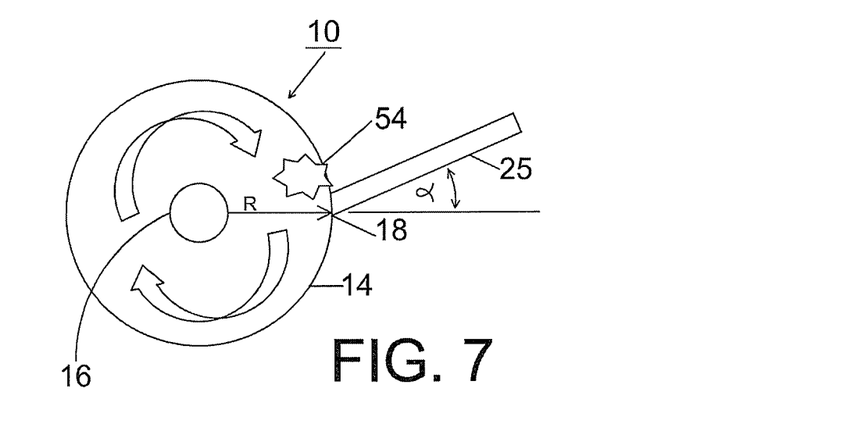
FIG. 7 is the same view as FIG. 6 of an alternative embodiment thereof.
Figure 8:
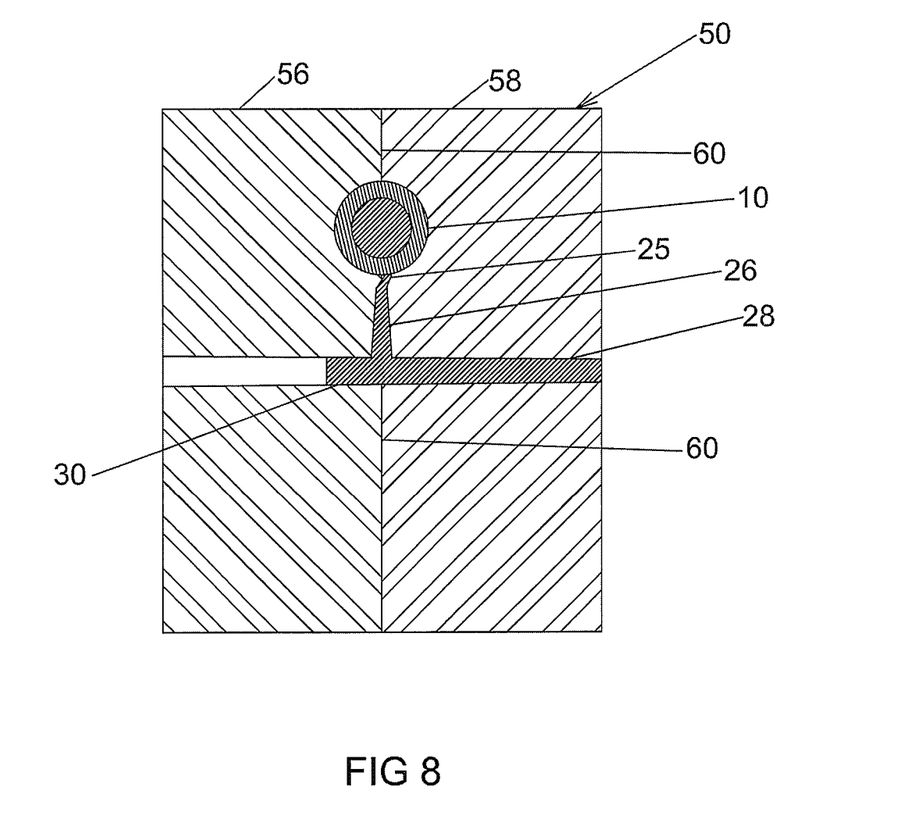
FIG. 8 is a sectional view of a mold assembly used to mold a bonded metal assembly.
Figure 9:
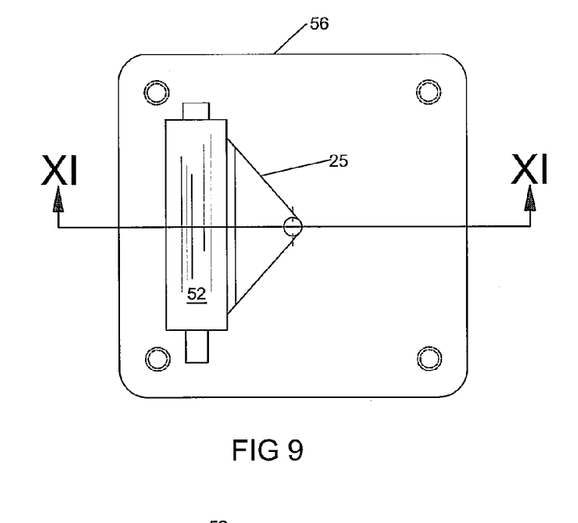
FIG. 9 is a right side elevation of a left mold half.
Figure 10:
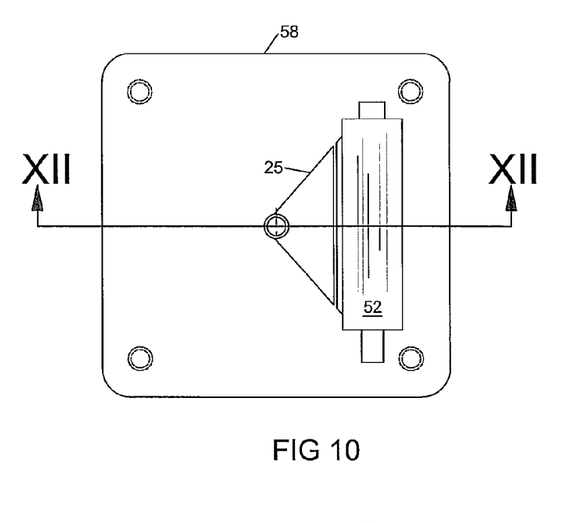
FIG. 10 is a left side elevation of a right mold half.
Figure 11:
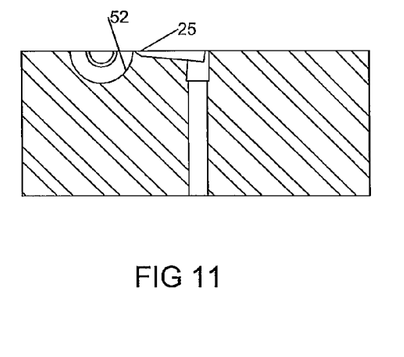
FIG. 11 is a sectional view taken along the lines XI-XI in FIG. 9.
Figure 12:
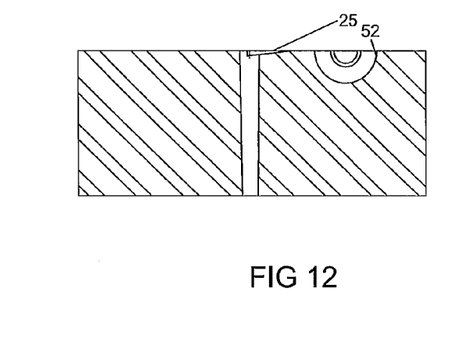
FIG. 12 is a sectional view taken along the lines XII-XII in FIG. 10.

In the illustrated embodiment, powdered metal-filled plastic member 14 is formed in a mold 50 defining a gate 25 that opens at an angle to radius R of powdered metal-filled plastic member 14. This causes the powdered metal-filled plastic material to travel generally tangentially along the curved surface 52 of mold 50 in which the powdered metal-filled plastic member is molded onto shaft 16. As illustrated in FIG. 7, the material flows generally unidirectionally around the mold until it reaches the material entering through gate 25 at a knit line 54. Thus, at least a portion of the material flows more than half of the circumference of the cylindrical surface of the mold forming core 14 and may flow substantially the full circumference of the cylindrical surface of the mold. The highest density of powdered metal is generally nearer the gate and the lower density is generally furthest from the gate. Therefore, any significant knit line illustrated schematically at 54 is formed adjacent gate line 18. The absence of a knit line opposite gate 25 provides more uniform distribution of the powdered metal in the plastic. This provides better magnetic characteristics when used to produce a permanent magnet as would be understood by the skilled artisan. In the illustrated embodiment, gate 25 is at an angle α of between proximately 30 and 60 degrees to the radius of the curved outer surface of the permanent magnet. However, a greater or lesser angle could be used.

Figure 6:
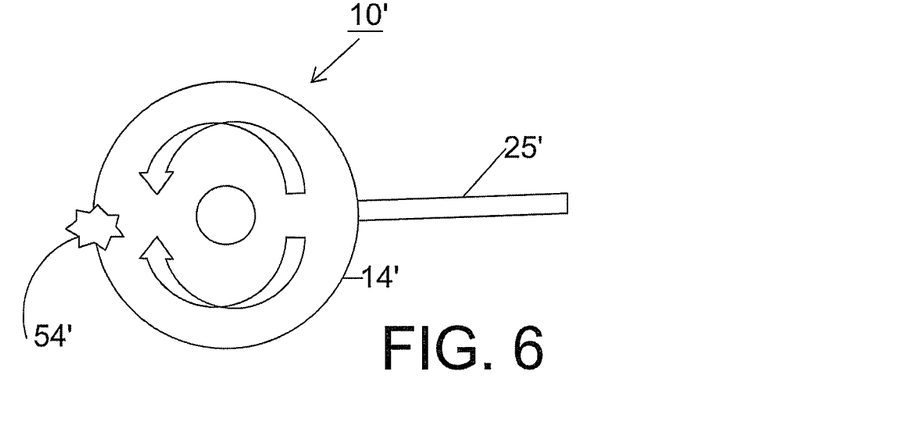
FIG. 6 is a schematic view of a molding process illustrating material flow through the gate and mold.

In another embodiment illustrated in FIG. 6, a bonded metal assembly 10' is formed in a mold (not shown) having a gate 25' that opens generally in line with radius R of powdered metal-filled plastic member 14'. In this embodiment, the powdered metal-filled plastic material travels generally tangentially, but in opposite directions around the mold. This results in a knit line 54' that is opposite gate 25'.

In the illustrated embodiment, mold 50 used to manufacture the bonded metal assembly is defined by a left mold half 56 and a right mold half 58 that may open along a part line 60 defined along a plane generally at runner 26. This allows bonded metal assembly 10 to be ejected radially from the mold using ejection pins (not shown) operating on outer portions 22 of cylindrical shaft 16. This results in a shorter ejection motion that if permanent magnet assembly 10 were to be ejected axially as would be with conventional end gate injection-molding technology. Also, it allows cylindrical surface 15 to have a substantially constant radius throughout its length. This is because it does not need to be tapered to accommodate axial ejection from the mold. Cylindrical shaft 16 may be positioned in the mold during the injection-molding process using magnets (not shown) engaging outer portions 22. However, other techniques may be used. While only one cavity is illustrated in FIGS. 8 through 12, another cavity may be provided that is the mirror image of that shown. This would allow a common sprue 28 to be used for two bonded metal assemblies.

Figure 4:
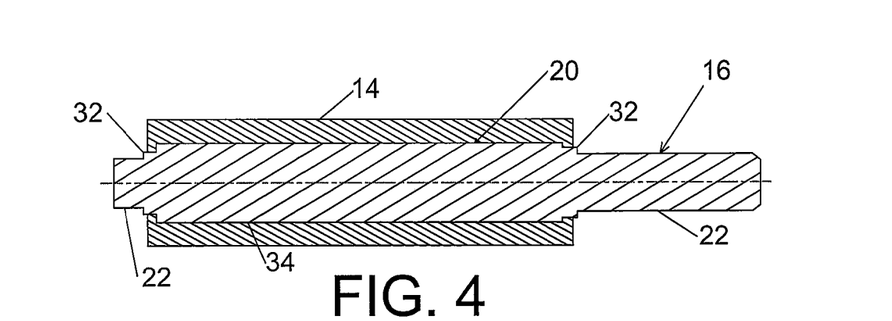
FIG. 4 is a sectional view taken along the lines III-III in FIG. 3.

In the illustrated embodiment, cylindrical shaft 16 has a central portion 20 and outer portions 22 on opposite axial sides of central portion 20. Central portion 20 has a radius that is greater than the radii of outer portions 22, as can be seen in FIG. 4. An intermediate step 32 may be provided between central portion 20 and each outer portion 22. Powdered metal-filled plastic member 14 extends axially outwardly past central portion 20. This causes the powdered metal-filled plastic member to envelope central portion 20 in order to provide a more mechanically stable assembly. Central portion 20 may have a knurled outer surface 34 in order to provide better rotational engagement between powdered metal-filled plastic member 14 and shaft 16. In the illustrative embodiment, shaft 16 is made from stainless steel, although other materials may be used according to the application of the magnet assembly, such as solid iron, laminated iron, partial plastic, or the like. Also, other shapes for the form besides cylindrical may be provided.

Figures 13, 14:
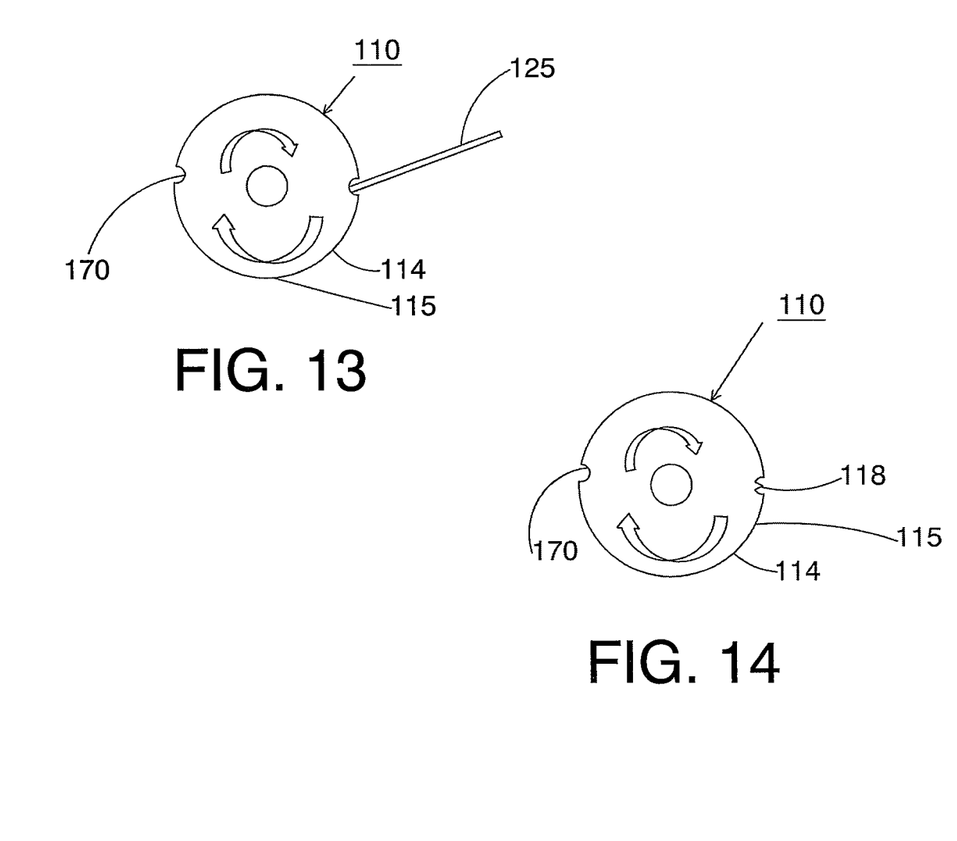
FIG. 13 is the same view as FIG. 7 of an alternative embodiment thereof.
FIG. 14 is the same view as FIG. 13 during a subsequent manufacturing step.

A bonded metal assembly 110, according to another embodiment, includes a recessed tangent gate line 118 that does not extend beyond the cylindrical surface 115 of a powdered metal-filled plastic member 114. Gate line 118 is made using a gate 125 (FIGS. 13 and 14). A matching recess 170 is formed in core 114 to provide rotational balance to the assembly.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A method of manufacturing a bonded metal assembly having a form and a powdered metal-filled plastic permanent magnet member, said powdered metal-filled plastic member having a cylindrical surface generally surrounding said form, said method comprising:
   using a mold having a cylindrical interior surface corresponding generally to the cylindrical surface of the powdered metal-filled plastic member;
   using a gate to the mold, said gate extending at least partially along a radius of the cylindrical interior surface of the mold;
   positioning the form in said mold; and
   injecting a powdered metal-filled plastic material made up of a powdered metal in a plastic through said gate to said mold and flowing the material in the mold in a manner that the powdered metal is generally uniformly distributed throughout the member thereby enhancing magnetic characteristic of the assembly including flowing the material generally unidirectionally substantially the full circumference around the form wherein a higher density of powdered metal in the plastic injected through said gate is offset by a lower density of powdered metal in the plastic that has flowed substantially the full circumference around the form.

2. The method as claimed in claim 1 wherein said flowing includes flowing at least a portion of the material generally tangentially along the cylindrical interior surface of the mold.

3. The method as claimed in claim 2 wherein said gate opens in a direction forming an angle to the radius of the cylindrical interior surface at the gate thereby having a component that is tangential to the cylindrical interior surface of the mold.

4. The method as claimed in claim 1 including ejecting the bonded metal assembly radially from the mold.

5. The method as claimed in claim 1 used to manufacture a bonded metal assembly having a powdered metal-filled plastic member with a length to diameter ratio that is greater than 1 to 1.

6. The method as claimed in claim 5 wherein said ratio is greater than 2 to 1.

7. The method as claimed in claim 1 wherein said gate extends at least 50% of the axial length of said cylindrical inner surface of said mold.

8. The method as claimed in claim 7 wherein said gate extends at least 80% of the axial length of said cylindrical inner surface of said mold.

9. The method as claimed in claim 1 used to manufacture a powdered metal-filled plastic member weighing at least approximately 28 grams.

10. The method as claimed in claim 1 used to manufacture a rotor of a brushless DC motor producing at least approximately 50 watts of mechanical power.

11. The method as claimed in claim 1 used to manufacture a permanent magnet assembly.

12. The method as claimed in claim 11 wherein the form comprises a shaft and the powdered metal-filled plastic member comprises a permanent magnet surrounding said shaft.

13. A method of manufacturing a bonded metal assembly having a form and a powdered metal-filled plastic member, said powdered metal-filled plastic member having a cylindrical surface generally surrounding said form, said method comprising:
   using a mold having a cylindrical interior surface corresponding generally to the cylindrical surface of the powdered metal-filled plastic member;
   using a gate to the mold, said gate extending at least partially along a radius of the cylindrical interior surface of the mold;
   positioning the form in said mold; and
   injecting a powdered metal-filled plastic material through said gate to said mold and flowing the material around the form, wherein said flowing includes flowing at least a portion of the material generally tangentially along the cylindrical interior surface of the mold, wherein said gate opens in a direction forming an angle to the radius of the cylindrical interior surface at the gate thereby having a component that is tangential to the cylindrical interior surface of the mold, wherein said gate is at an angle of between approximately 30 degrees and approximately 60 degrees to the radius of the cylindrical interior surface, wherein said gate extends at least 50% of the axial length of said cylindrical inner surface of said mold.

14. A method of manufacturing a powdered metal-filled plastic permanent magnet member having a generally cylindrical outer surface, said method comprising:
   using a mold having a curved interior surface corresponding generally to the curved outer surface of the powdered metal-filled plastic member;

using a gate to the mold, said gate opening at an angle to a radius of the curved outer surface of the powdered metal-filled plastic member; and injecting a powdered metal-filled plastic material made up of a powdered metal in a plastic through the gate to the mold and flowing at least a portion of the material generally tangentially along the generally cylindrical interior surface of the mold in a manner that the powdered metal is generally uniformly distributed throughout the member thereby enhancing magnetic characteristic of the member including flowing the material generally unidirectionally substantially the full circumference of said generally cylindrical surface, wherein a higher density of powdered metal in the plastic injected through said gate is offset by a lower density of powdered metal in the plastic that has flowed substantially the full circumference around the mold.

15. The method as claimed in claim 14 wherein said gate opens at an angle of between proximately 30 and 60 degrees to the radius of the curved outer surface of the powdered metal-filled plastic member.

16. The method as claimed in claim 14 including positioning a form in said mold prior to said injecting.

17. The method as claimed in claim 16 wherein said flowing at least a portion of the material includes flowing the portion of the material generally unidirectionally along the curved interior surface around said form.

18. The method as claimed in claim 16 wherein said form comprises a cylinder having a central portion and outer portions.

19. The method as claimed in claim 18 wherein said central portion has a greater radius than said outer portions and wherein the powdered metal-filled plastic member extends outwardly past said central portion.

20. The method as claimed in claim 14 used to manufacture a permanent magnet.

21. A method of manufacturing a powdered metal-filled plastic member having a curved outer surface, said method comprising:

using a mold having a curved interior surface corresponding generally to the curved outer surface of the powdered metal-filled plastic member;

using a gate to the mold, said gate opening at an angle to a radius of the curved outer surface of the powdered metal-filled plastic member; and injecting a powdered metal-filled plastic material through the gate to the mold and flowing at least a portion of the material generally tangentially along the curved interior surface of the mold, wherein said gate extends along a radius of the curved surface at least 50% of the length of said cylindrical surface, wherein said gate opens at an angle of between approximately 30 and 60 degrees to the radius of the curved outer surface of the powdered metal-filled plastic member.

22. The method as claimed in claim 21 wherein said gate extends at least 80% of the length of said cylindrical surface.

23. The method as claimed in claim 21 wherein said flowing at least a portion of the material includes flowing the portion of the material more than half of the circumference of said cylindrical surface.

24. The method as claimed in claim 23 including flowing the portion of the material substantially the full circumference of said cylindrical surface.

25. The method as claimed in claim 24 wherein said gate opens at an angle of between proximately 30 and 60 degrees to the radius of the curved outer surface of the powdered metal-filled plastic member.

* * * * *